United States Patent
Schuett et al.

(10) Patent No.: US 7,287,559 B1
(45) Date of Patent: Oct. 30, 2007

(54) METHOD AND APPARATUS FOR PROCESSING SAUERKRAUT FOR PACKAGING IN SINGLE-SERVE PACKETS

(75) Inventors: Jerry Schuett, Gibsonburg, OH (US); Dale J. Elford, Risingsun, OH (US); Donald B. Slessman, Jr., Fremont, OH (US)

(73) Assignee: The Fremont Company, Fremont, OH (US)

( * ) Notice: Subject to any disclaimer, the term of this patent is extended or adjusted under 35 U.S.C. 154(b) by 423 days.

(21) Appl. No.: 10/935,338

(22) Filed: Sep. 7, 2004

Related U.S. Application Data

(60) Provisional application No. 60/567,026, filed on Apr. 30, 2004.

(51) Int. Cl.
  *B67C 3/26* (2006.01)
(52) U.S. Cl. .............. 141/256; 141/248; 222/239; 426/106
(58) Field of Classification Search ........... 141/234, 141/248, 256; 222/227, 236, 239; 426/106
  See application file for complete search history.

(56) References Cited

U.S. PATENT DOCUMENTS

| | | | |
|---|---|---|---|
| 2,716,510 A | * | 8/1955 | Massmann ............ 222/227 |
| 2,756,154 A | | 7/1956 | Mahaffy |
| 4,105,383 A | * | 8/1978 | Hanson ............... 425/96 |
| 4,350,444 A | * | 9/1982 | Yargus et al. .......... 366/141 |
| 4,959,931 A | * | 10/1990 | Howells ............... 451/99 |
| 5,670,193 A | | 9/1997 | Vreugde |

* cited by examiner

*Primary Examiner*—Timothy L. Maust
(74) *Attorney, Agent, or Firm*—Emch, Schaffer, Schaub & Porcello, Co., L.P.A.

(57) ABSTRACT

Sauerkraut that is free of added vegetable oil or other lubricant is prepared for packaging in small volumes by substantially continuously delivering a supply of the sauerkraut to a hopper (20) with an open top (22), the sauerkraut being delivered to the hopper at a location between a baffle (24) that periodically reciprocates within the hopper and a plurality of openings (28) at a bottom of the hopper. A tube (26) extends substantially vertically downwardly from each of the openings, and sauerkraut in the hopper is positively caused to flow from each of the openings into and through a tube that is aligned with the opening by rotating a rotatable screw (40) with a larger diameter upper portion (40*a*) that extends downwardly through the hopper and a smaller diameter lower portion (40*b*) that extends downwardly from the upper portion into and at least substantially through a tube.

10 Claims, 3 Drawing Sheets

METHOD AND APPARATUS FOR PROCESSING SAUERKRAUT FOR PACKAGING IN SINGLE-SERVE PACKETS

CROSS-REFERENCE TO RELATED APPLICATION

This application is based on U.S. provisional application No. 60/567,026 now abandoned, which was filed on Apr. 30, 2004.

FIELD OF THE INVENTION

This invention relates to a method of and an apparatus for processing sauerkraut for packaging in single-serve packets.

BACKGROUND OF THE INVENTION

U.S. Pat. No. 5,670,193 (Vreugde) describes a single-serve package of sauerkraut and a method of packaging sauerkraut in single-serve packages. The package of the '193 patent requires the addition of a predetermined quantity of an edible vegetable oil to the sauerkraut, however, to overcome the resistance to flow of sauerkraut due to its fibrous texture. For various dietary reasons, however, it is desirable to package sauerkraut without the need to introduce a vegetable oil or other lubricant in the sauerkraut to permit it to flow properly during packaging.

BRIEF DESCRIPTION OF THE INVENTION

According to the present invention, there is provided a method of and an apparatus for processing sauerkraut for packaging in small quantities, for example, no more than approximately 1-½ oz., that does not require the addition of a lubricant, such as an edible vegetable oil, to the sauerkraut to improve its flow properties. According to the present invention, sauerkraut is conveyed to an elevated hopper and is dispensed from the hopper through one or more tubes that extend vertically downwardly from an opening at the bottom of the hopper to fill a succession of as yet unclosed packages that receive sauerkraut that has descended from the hopper from one or another of the tubes. The sauerkraut is received in an opening at the top of the hopper in front of a movable baffle that is movable across the width of the hopper, and the baffle is periodically reciprocated to force the sauerkraut toward an outlet from the hopper into the tube or tubes that extend downwardly therefrom. The downward flow of sauerkraut through each tube is positively driven by a rotating auger or screw to ensure that there will be no clogging of the sauerkraut in the tube.

Accordingly, it is the object of the present invention to provide a method of and an apparatus for conveying sauerkraut to be packaged to one or more location(s) in which the sauerkraut can be received in individual packets and which does not require the introduction of any edible oil or other lubricant into the sauerkraut to overcome its natural resistance to flow.

For a further understanding of the present invention and the objects thereof, attention is directed to the drawing in the following brief description thereof, to the detailed description of the invention and to the appended claims.

IN THE DRAWINGS

DETAILED DESCRIPTION OF THE INVENTION

Figure 1:
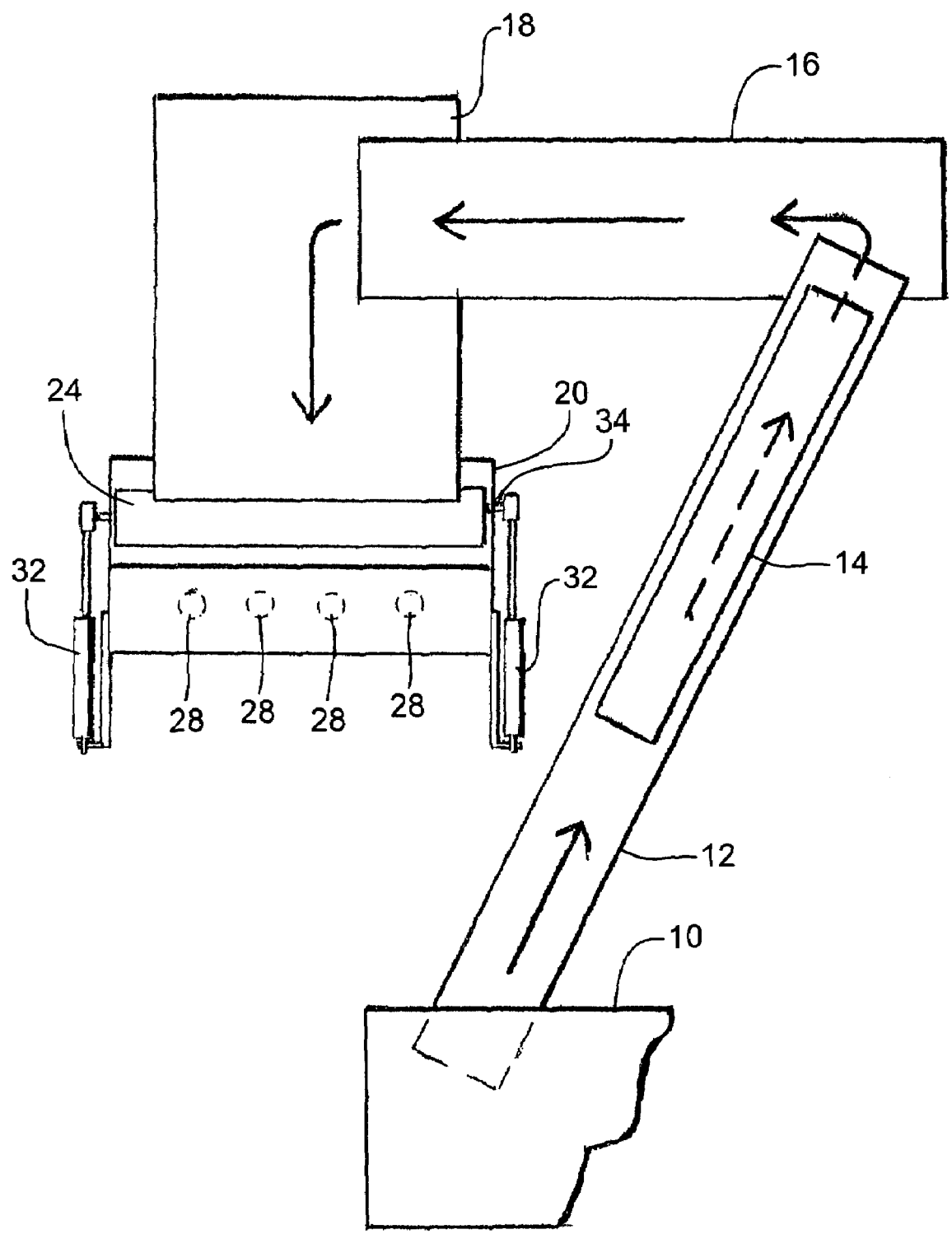
FIG. 1 is a schematic, plan view of various pieces of equipment and step, that are used in the processing of sauerkraut according to the present invention.

As is shown in FIG. 1, previously prepared sauerkraut is conveyed from a storage area by a conveyor 10, which generally extends horizontally, and is deposited on an upwardly inclined conveyor 12. The sauerkraut from the conveyor 10 is usually quite moist, in which case a conveyor 14 is positioned above an upper flight of the conveyor 12 to compress the sauerkraut on the conveyor 12, to thereby squeeze excess moisture therefrom. In any case, sauerkraut from the conveyor 14 is deposited on a cross-conveyor 16 from which it is conveyed to an inlet conveyor 18 that introduces the sauerkraut into a hopper 20.

Figure 2:
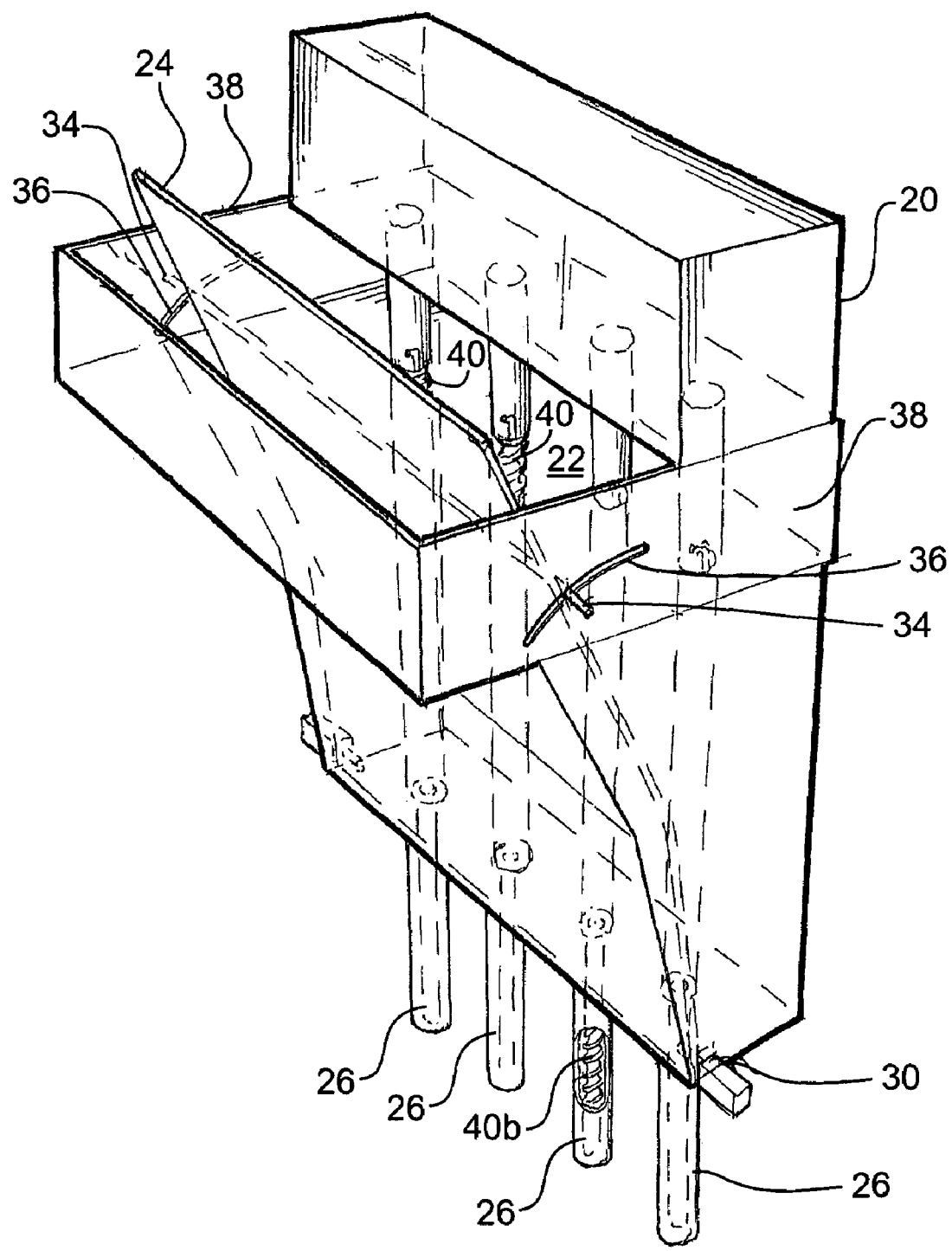
FIG. 2 is a perspective view, at an enlarged scale, of a portion of the equipment that is schematically illustrated in FIG. 1.
Figure 3:
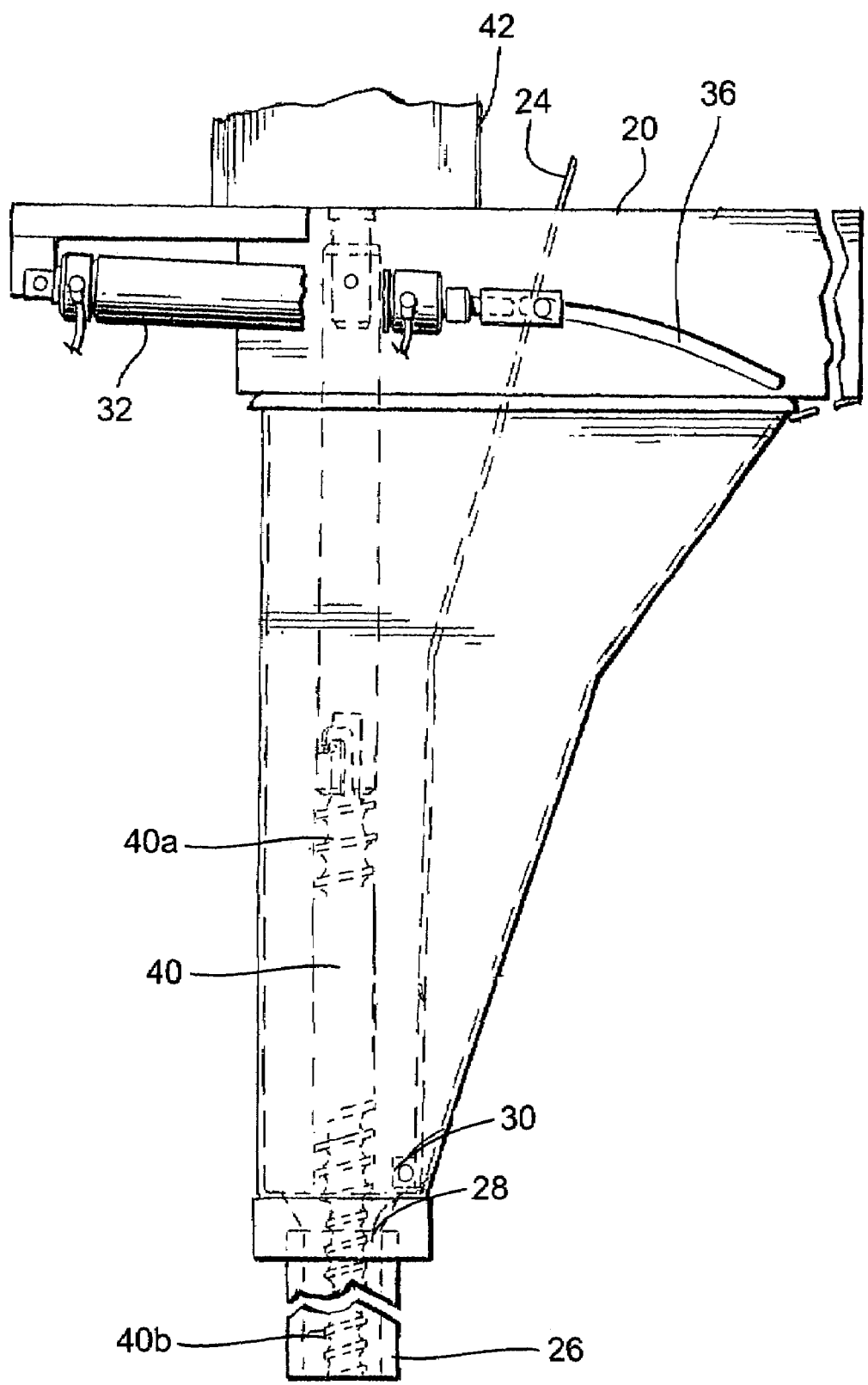
FIG. 3 is a side elevation view, with additional structure, of the apparatus that is illustrated in FIG. 2.

As shown in greater detail in FIGS. 2 and 3, the hopper 20 has an open top 22, and sauerkraut is introduced into the hopper 20 through the open top 22 in between a baffle 24 and one or more, shown as four, outlet tubes that extend vertically downwardly from an aligned openings 28 and a bottom of the hopper 20. Sauerkraut is positively fed to the openings 28 through the tubes 26 by periodic reciprocation or oscillation of the baffle 24, which is pivoted at 30 and extends nearly completely across the width of the hopper 20. The reciprocation or oscillation of the baffle 24 is accomplished by the synchronized extension and retraction of opposed pneumatic cylinders 32, one of which is shown in FIG. 3. The cylinders 32 act on opposed ends of a rod 34 that is attached to the baffle 24 and extends through slots 36 in side plates 38 of the hopper 20.

The flow of sauerkraut from the hopper 20 into the tubes 26, and then through the tubes 26 to a conventional filling station, not shown, is positively directed by a rotating auger or screw 40 that is coaxially aligned with the respective tube 26, which is circular in cross-section, one screw 40 for each tube 26. Each screw 40 is positively driven by a rotating motor 42, for example, an electric motor. Each screw 40 has a larger diameter upper portion 40a, which causes sauerkraut to flow downwardly through the hopper 20 into the tube 26, and a smaller diameter lower portion 40b, which extends into and through each tube 26 and causes sauerkraut to flow through the tube 26. In a preferred embodiment, where sauerkraut is packaged in a building that is not climate-controlled, or at least not cooled on days where ambient temperatures are quite high, the tubes 26 are preferably constructed of a material that has a low coefficient of expansion, such as a plastic material, for dimensional stability.

Although the best mode contemplated by the inventors for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

We claim:

1. Apparatus for processing lubricant-free sauerkraut that is substantially free of added edible vegetable oil for packaging in single-serve packets, said apparatus comprising, in combination:

a hopper for receiving the sauerkraut from a supply, said hopper having a pivoted baffle for periodically reciprocating to and fro within said hopper, said hopper being adapted to receive sauerkraut at a location between a front of said baffle and at least one outlet from said hopper, said hopper further comprising means for periodically reciprocating said baffle toward and away from said outlet;

at least one tube extending substantially vertically downwardly from said hopper and aligned with said at least one outlet;

at least one rotatable screw extending downwardly through said hopper and coaxially aligned with said at least one outlet, said rotatable screw extending to and at least partly into said at least one tube and rotatable to move said sauerkraut downwardly; and means positioned above said hopper for rotating said at least one rotatable screw.

2. Apparatus according to claim 1 wherein:

said at least one outlet comprises a spaced-apart plurality of outlets;

said at least one tube comprises a spaced-apart plurality of tubes, each of said tubes being aligned with one of said outlets;

said at least one rotatable screw comprising a spaced-apart plurality of rotatable screws, each of said rotatable screws being co-axially aligned with one of said outlets and one of said tubes; and said means for rotating said at least one rotatable screw comprises a spaced-apart plurality of means for rotating, each of said means for rotating serving to rotate one of said plurality of screws.

3. Apparatus according to claim 1 wherein:

said hopper has a slot in a sidewall thereof;

said baffle has a rod with an end that extends through said slot; and said means for periodically reciprocating said baffle comprises a linear actuator positioned externally to said hopper, said linear actuator engaging said rod of said baffle.

4. Apparatus for processing lubricant-free sauerkraut that is substantially free of added edible vegetable oil for packaging in single-serve packets, said apparatus comprising, in combination:

a hopper for receiving the sauerkraut from a supply, said hopper having a pivoted baffle for periodically reciprocating to and fro within said hopper, said hopper being adapted to receive sauerkraut from said hopper at a location between a front of said baffle and a plurality of spaced-apart outlets, said hopper further comprising means for periodically reciprocating said baffle toward and away from said outlets, a plurality of spaced-apart tubes extending substantially vertically downwardly from said hopper and each aligned with one of said outlets;

a plurality of spaced-apart rotatable screws extending downwardly through said hopper and each coaxially aligned with one of said outlets, each said rotatable screw extending to and at least partly into a tube;

means positioned above said hopper for rotating said screws;

said hopper having a slot in each of an opposed pair of sidewalls;

said baffle having a rod with an opposed pair of ends, each of said opposed pair of ends extending through a slot in one of said opposed pair of sidewalls; and said means for periodically reciprocating said baffle comprising a pair of linear actuators, each of said pair of linear actuators being positioned externally to said baffle and engaging one of said opposed pair of ends of said rod.

5. Apparatus for processing lubricant-free sauerkraut that is substantially free of added edible vegetable oil for packaging in single-serve packets, said apparatus comprising, in combination;

a hopper for receiving the sauerkraut from a supply, said hopper having a pivoted baffle for periodically reciprocating to and fro within said hopper, said hopper being adapted to receive sauerkraut at a location between a front of said baffle and at least one outlet from said hopper, said hopper further comprising means for periodically reciprocating said baffle toward and away from said outlet;

at least one tube extending substantially vertically downwardly from said hopper and aligned with said at least one outlet;

at least one rotatable screw extending downwardly through said hopper and coaxially aligned with said at least one outlet, said rotatable screw extending to and at least partly into said at least one tube;

said at least one rotatable screw having a larger diameter upper portion that extends downwardly through said hopper toward said at least one tube and a smaller diameter lower portion that extends downwardly from said upper portion through said at least one tube; and means positioned above said hopper for rotating said at least one rotatable screw.

6. Apparatus according to claim 2 wherein:

each of said plurality of rotatable screws comprises a larger diameter upper portion that extends downwardly through said hopper toward one of said plurality of outlets and a smaller diameter lower portion that extends downwardly from said upper portion through one of said plurality of tubes.

7. Apparatus according to claim 1 wherein:

said at least one tube is made of a low coefficient of expansion plastic material.

8. Apparatus according to claim 2 wherein:

each of said plurality of tubes is made of a low coefficient of expansion plastic material.

9. The method of processing sauerkraut for packaging in small packages; the method comprising:

substantially continuously providing a substantially edible vegetable oil-free supply of sauerkraut;

delivering the supply of sauerkraut to a hopper that has at least one outlet therefrom, the supply of sauerkraut being at a location between the at least one outlet and a baffle that is reciprocable within the hopper toward and away from the at least one outlet;

periodically reciprocating the baffle within the hopper toward and away from the at least one outlet to advance sauerkraut toward the at least one outlet;

providing at least one tube extending substantially vertically downwardly from the at least one outlet from the hopper; and positively causing sauerkraut to flow from the hopper into and through the at least one tube by rotating a rotatable screw that has an upper portion that extends through the hopper and a lower portion that extends into and at least substantially through the at least tube.

10. The method of claim 9 wherein:

the hopper has a spaced-apart plurality of outlets therefrom;

the baffle is periodically reciprocated within the hopper toward and away from each of said plurality of outlets to advance sauerkraut toward each of the plurality of outlets;

the providing of at least one tube extending substantially vertically downwardly from the at least one outlet from the hopper comprises providing a spaced-apart plurality of tubes each of which extends substantially vertically downwardly from one of the plurality of outlets from the hopper; and the step of positively causing sauerkraut to flow from the hopper comprises positively causing sauerkraut to flow from the hopper into and through each of the plurality of tubes by rotating a plurality of rotatable screws, each of the plurality of screws having an upper portion that extends through the hopper and a lower portion that extends from the upper portion into and substantially through the plurality of tubes.

* * * * *